Sept. 28, 1954

A. VIEHWEGER 2,690,096

MILLING ATTACHMENT FOR LATHES

Filed Feb. 14, 1949

INVENTOR.
August Viehweger
BY
ATTORNEY.

Sept. 28, 1954                    A. VIEHWEGER                    2,690,096
                           MILLING ATTACHMENT FOR LATHES
Filed Feb. 14, 1949                                          5 Sheets-Sheet 3

INVENTOR.
August Viehweger
BY
 Otto A. Earl
ATTORNEY.

Sept. 28, 1954
A. VIEHWEGER
2,690,096
MILLING ATTACHMENT FOR LATHES
Filed Feb. 14, 1949
5 Sheets-Sheet 4
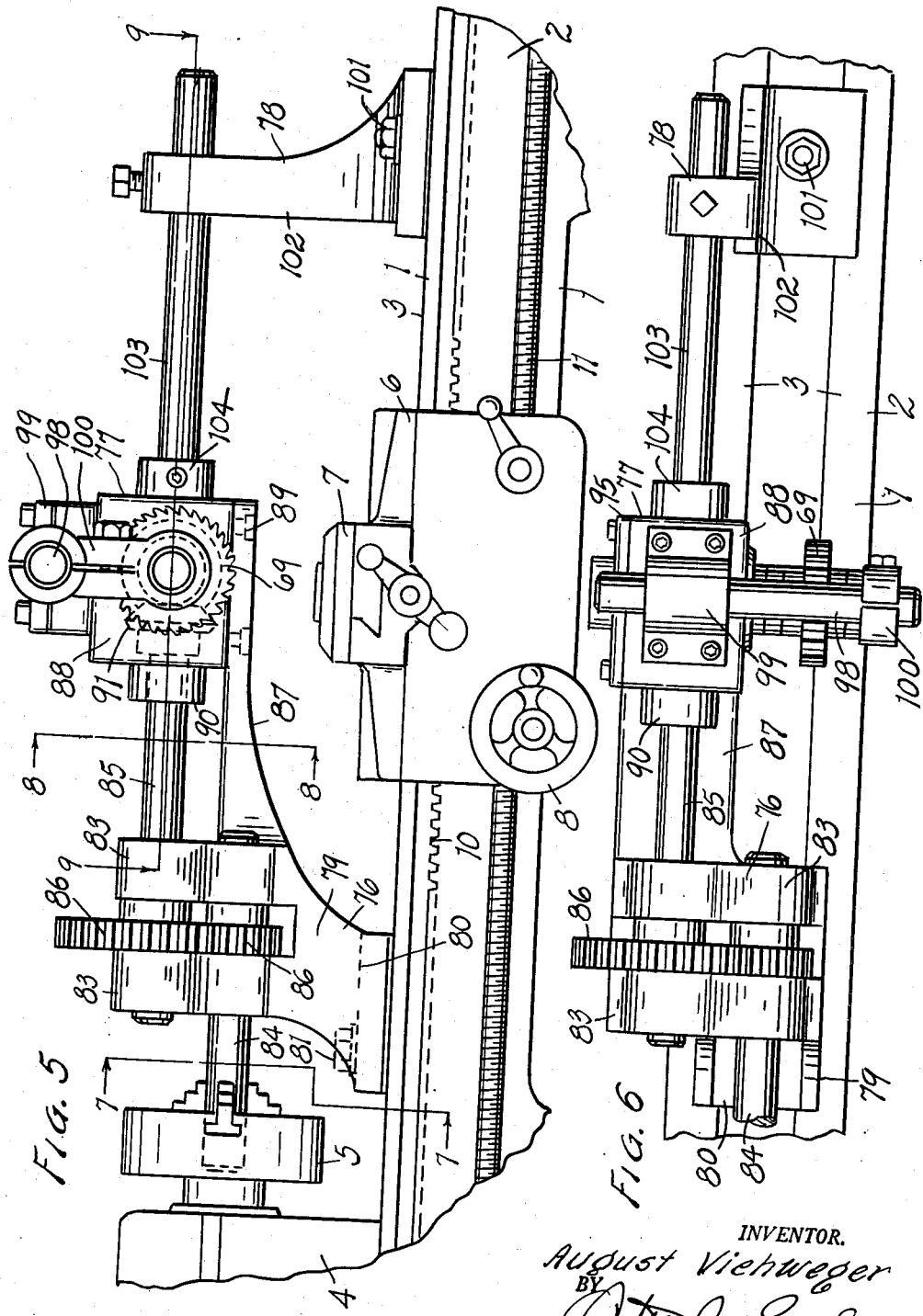
INVENTOR.
August Viehweger
BY
Otto A. Earl
Attorney.

Sept. 28, 1954  A. VIEHWEGER  2,690,096
MILLING ATTACHMENT FOR LATHES
Filed Feb. 14, 1949  5 Sheets-Sheet 5

INVENTOR.
August Viehweger
BY
Attorney

Patented Sept. 28, 1954

2,690,096

UNITED STATES PATENT OFFICE 2,690,096

MILLING ATTACHMENT FOR LATHES

August Viehweger, Caledonia, Mich., assignor to Adaptor Machine Company, a corporation of Michigan Application February 14, 1949, Serial No. 76,329

12 Claims. (Cl. 90—16)

This invention relates to improvements in milling attachments for lathes.

The principal objects of this invention are:

First, to provide an attachment by means of which a lathe may be used as a milling machine.

Second, to provide an attachment for converting a lathe to a milling machine in which the milling cutter operates in a vertical plane parallel to the ways of the lathe.

Third, to provide a conversion attachment for a lathe by means of which the lathe may be used as a milling machine with the carriage and table of the lathe serving as a work holding and work advancing means for the milling cutter.

Fourth, to provide one form of milling attachment for a lathe which is vertically adjustable relative to the bed of the lathe to accommodate work pieces of various thicknesses.

Fifth, to provide an inexpensive mechanism for converting a lathe for use as a milling machine.

Other objects and advantages of my milling attachment will be apparent from a consideration of the following description and claims.

The drawings of which there are five sheets illustrate two forms of my milling attachment.

Fig. 4 is a fragmentary transverse cross sectional view through the lathe and head stock unit, taken along the plane of the line 4—4 in Fig. 1.

Fig. 5 is a fragmentary front elevational view of a modified form of my lathe attachment as mounted on a lathe.

Fig. 6 is a fragmentary plan view of the attachment shown in Fig. 5.

Figure 1:
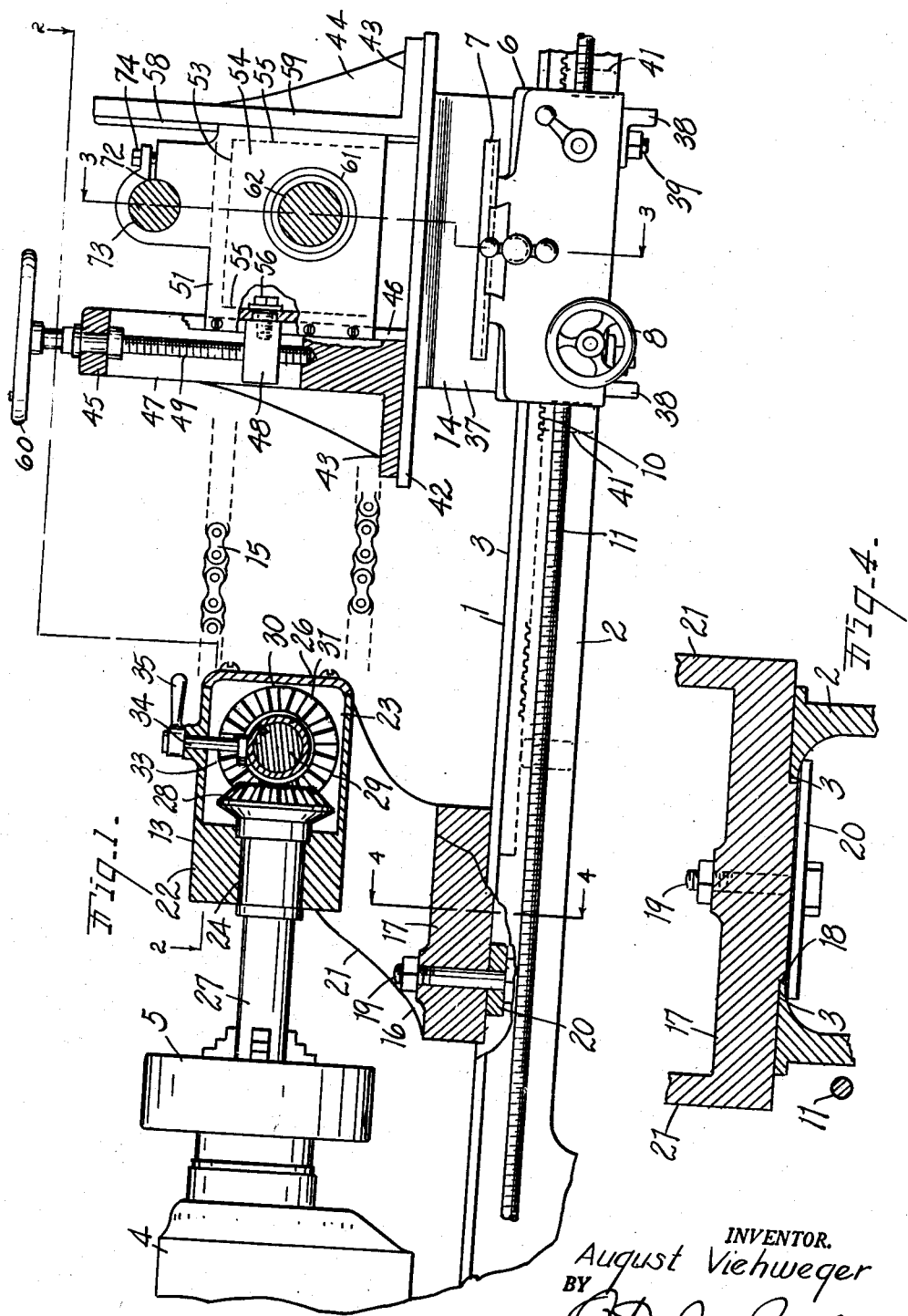
Fig. 1 is a fragmentary front elevational view of a lathe with my milling attachment mounted thereon, portions of the attachment and lathe being broken away in vertical cross section along the plane of the broken line 1—1 in Fig. 2.

Both forms of my milling attachment are designed for cooperation with the attachment to a standard type of lathe 1, having a bed 2 on which the parallel ways 3 are formed. The lathe is provided with the head stock 4 and chuck 5. The ways 3 slidably support a carriage 6 and the carriage in turn supports a table 7 for sliding motion transversely of the ways. The carriage 6 is adjusted along the ways by means of the hand wheel 8 and gear 9 engageable with a rack 10 formed on the bed. The lathe may be provided with automatic carriage driving mechanism such as the feed screw 11.

Figure 2:
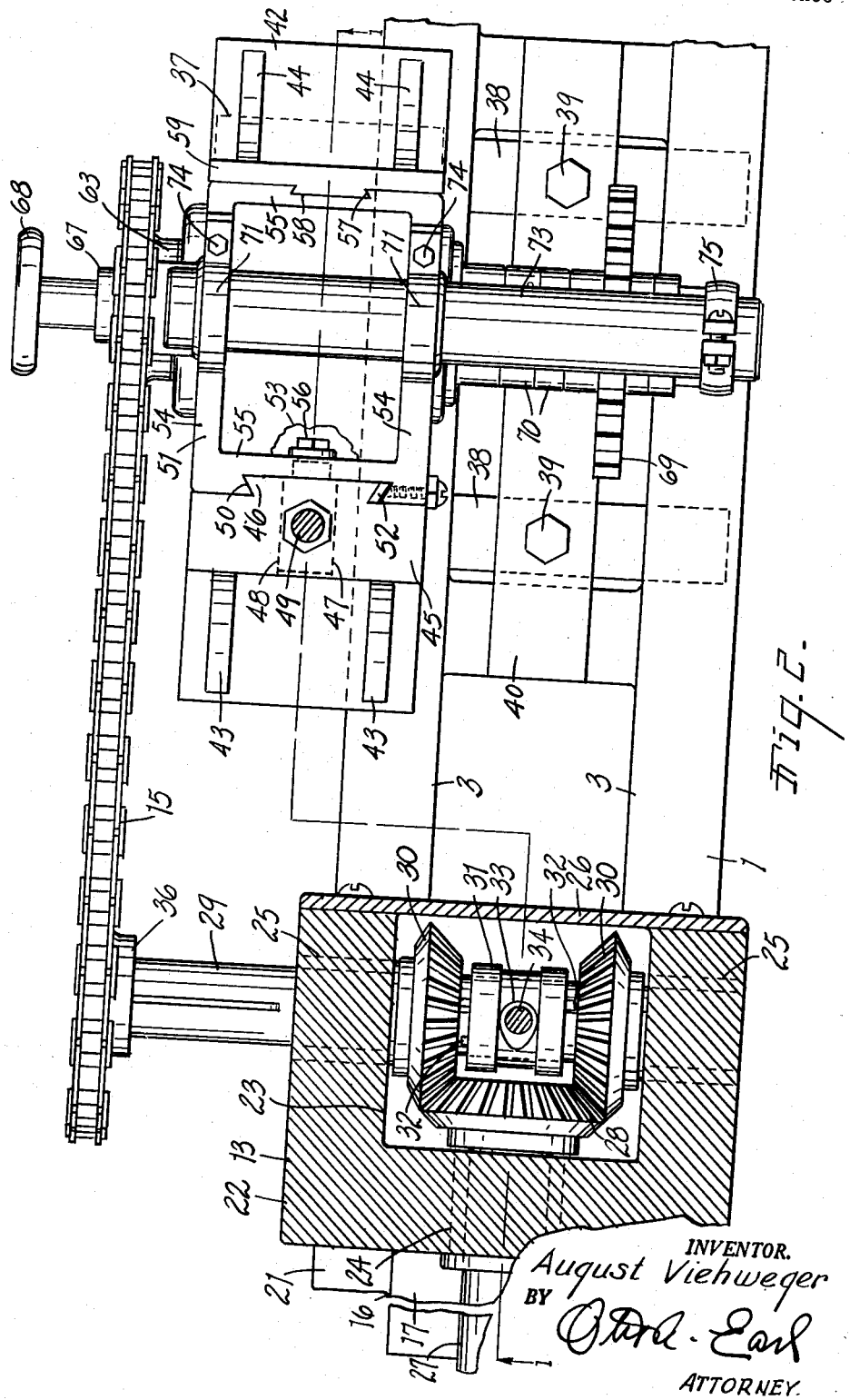
Fig. 2 is a fragmentary plan view of the attachment shown in Fig. 1, partially broken away in horizontal cross section along the plane of the line 2—2 in Fig. 1.
Figure 3:
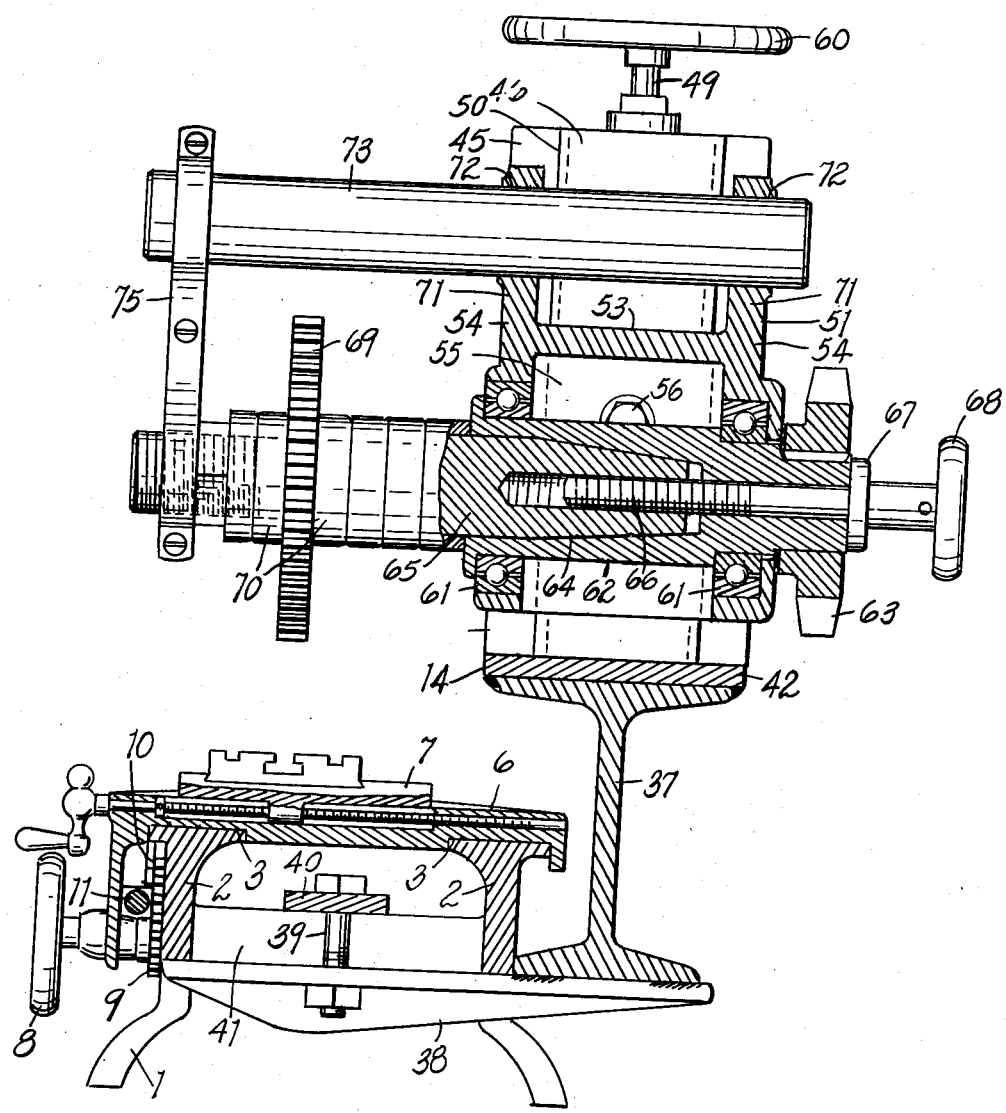
Fig. 3 is a transverse vertical cross sectional view through the milling unit of my milling attachment taken along the plane of the line 3—3 in Fig. 1.

The first form of my milling attachment illustrated in Figs. 1 to 4 consists generally of a head stock driving unit 13 and a milling unit 14 which are supported independently on the bed of the lathe and drivingly connected by the sprocket chain 15. The head stock unit 13 consists of a bracket 16 having a base 17 supported on the lathe ways 3. Preferably a portion of the base projects between the ways as at 18 to center the bracket on the lathe and a bolt 19 and clamp bar 20 are provided for securely clamping the bracket to the lathe.

Above the base 17 the bracket 16 is provided with upstanding flanges 21 which are integrally joined with and support a gear housing 22. The walls of the housing 22 form a gear recess 23, a spindle shaft bearing opening 24 and a pair of driven shaft bearing openings 25. The open end of the gear recess is closed by the side cover plate 26. Journaled in the spindle shaft bearing opening 24 is a spindle 27, the outer end of which is adapted to be received in and drivingly engaged by the chuck 5 of the lathe. The inner end of the spindle 27 has the bevel driving gear 28 formed thereon.

A cross shaft 29 is journaled in the bearing opening 25 and extends transversely of the ways of the lathe and to the rear of the housing 22. Within the gear recess 23 the cross shaft 29 rotatably supports a pair of oppositely rotating gears 30 in driving engagement with the driving gear 28. Either of the gears 30 is selectively connectable to the cross shaft 29 by means of a clutch sleeve 31 slidably keyed to the shaft and having jaws 32 selectively engaged with the gears 30. Movement of the clutch sleeve is controlled by means of a cam 33 operated by the shaft 34 and handle 35 carried by the top wall of the housing 22. The rear end of the cross shaft 29 carries a sprocket 36 for driving the chain 15.

The milling unit 14 consists of a base 37 of I-beam cross section which is supported to the rear of the lathe by a pair of forwardly extending arms 38 which project underneath the bed of the lathe. The arms are clamped to the bed of the lathe by a pair of bolts 39 extending upwardly through a clamp bar 40 supported on the top of the cross members 41 between the front and rear rails of the lathe bed.

Secured to the top flange of the base 37 is a plate 42 which has the opposed brackets 43 and 44 secured thereto in longitudinally spaced relationship along the bed of the lathe. The left bracket 43 as viewed in the drawings is provided with an upright 45 having a dove tail tongue 46 formed along its vertical face. The upright 45 is vertically slotted as at 47 forming a slideway for the follower bolck 48 and an adjusting screw 49 extends through the slot 47 and engages the block 48 for vertical adjustment of the block in the slot.

The dove tail tongue 46 is slidably received in a mating dove tail slot 50 formed in the side of the milling shaft housing 51. The dove tail tongue and slot thus form a vertical slide and ways for the milling shaft housing and suitable gibs 52 may be provided on the milling shaft housing. The milling shaft housing consists of a generally rectangular hollow body having a top wall 53, front and rear walls 54 and side walls 55. The side wall 55 in which the dove tail slot 50 is formed is secured to the follower block 48 by a screw 56 and the opposite side wall 55 forms a dove tail slot 57 cooperative with a dove tail tongue 58 formed on the upright 59 of the right bracket 44.

It will thus be seen that the milling shaft housing is vertically slidably supported between the brackets 43 and 44 and can be adjusted vertically by rotation of the screw 49 and the hand wheel 60.

The front and rear walls 54 of the milling shaft housing are bored to receive the anti-friction bearings 61 which rotatably support the milling shaft 62. The shaft 62 extends to the rear of the milling shaft housing and has a keyed connection with a sprocket 63 driven by the chain 15. The shaft 62 is axially bored and recessed as at 64 to slidably receive the tapered end of the arbor 65. The clamp screw 66 extends through the rear of the milling shaft into the arbor and is provided with a collar 67 and hand wheel 68 to non-rotatably clamp the arbor in the shaft recess. A milling cutter 69 is carried by the arbor in the usual fashion and located axially thereon by a plurality of spacing washers 70. The front and rear walls of the milling shaft housing are provided with upstanding ears 71 which are bored and slotted as at 72 to receive a steady bar 73 projecting forwardly over the cutter 69. The bar 73 is adjustably clamped in the ears by the screws 74 and a steady link 75 is clamped between the outer ends of the steady bar and arbor 65 to assist in holding the milling cutter 69 in position while operating.

From the foregoing description it should be apparent that my head stock unit 13 and milling unit 14 are easily clamped to a standard lathe to receive driving energy from the chuck of the lathe and transmit it to the milling cutter which is vertically adjustably positioned over the ways of the lathe. The standard carriage and table of the lathe can thus be used as a work holder for presenting work to the milling cutter. No alterations of the lathe are required and the milling attachment is easily installed or removed so that with a relatively small outlay in addition to the lathe, I am able to provide both a lathe and a milling machine.

Figures 7, 8:
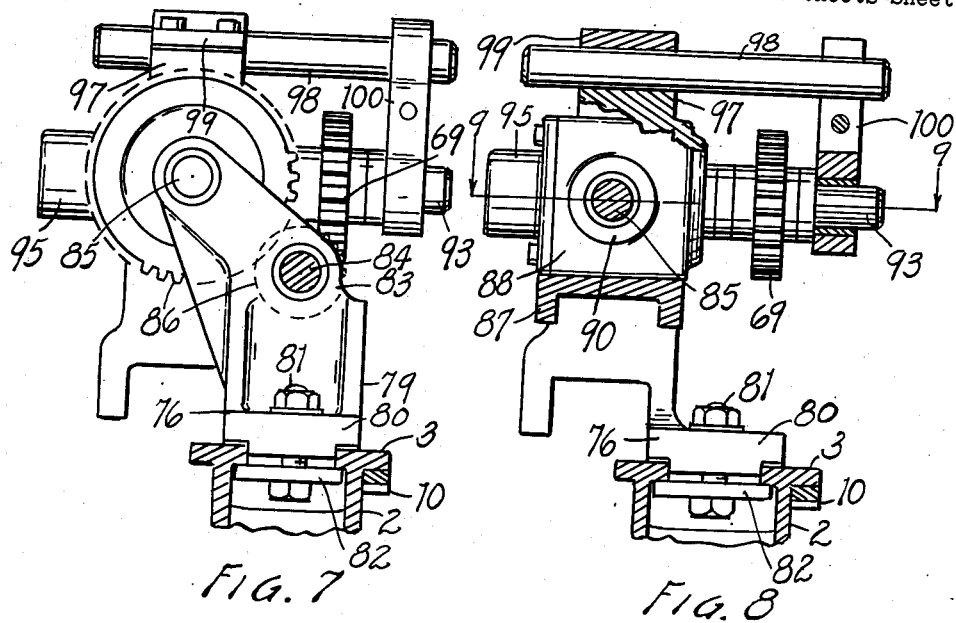
Fig. 7 is an end elevational view of the attachment as mounted on the lathe, the lathe being shown in section along the plane of the line 7—7 in Fig. 5.
Fig. 8 is a transverse cross sectional view through the lathe and attachment taken along the plane of the line 8—8 in Fig. 5.
Figure 9:
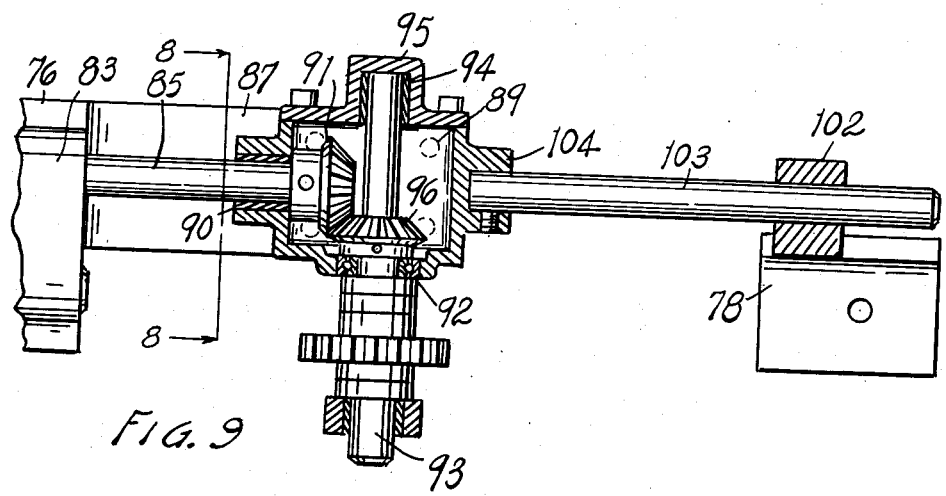
Fig. 9 is a fragmentary horizontal cross sectional view taken along the plane of the line 9—9 in Fig. 5.

The second form of my milling attachment illustrated in Figs. 5 to 9 consists of a head stock unit 76, a milling unit 77 and a brace bracket 78. The head stock unit 76 consists of a bracket 79 having a base 80 secured to the bed of the lathe by a bolt 81 and clamp bar 82. The bracket 79 extends upwardly to a pair of longitudinally spaced transversely extending plates 83 which rotatably support the spindle shaft 84 for engagement with the chuck of the lathe. The plates 83 extend rearwardly of the lower portion of the bracket and rotatably support the driven shaft 85. Gears 86 are provided on the shafts 84 and 85 between the plates 83 to transmit driving force to the shaft 85.

The right end of the bracket 79 is provided with a longitudinally extending arm 87 which rigidly supports the milling unit 77. The milling unit 77 consists of a housing 88 secured to the arm 87 by the screws 89. One side wall of the housing 88 forms a bearing 90 for the driven shaft 85 and a beveled gear 91 is carried on the driven gear within the housing. The front wall of the housing 88 carries the bearing 92 for the spindle shaft 93 and the rear end of the spindle shaft is journaled in a bearing 94 carried in the side cover plate 95 of the housing. A bevel gear 96 is mounted on the spindle in driving engagement with the bevel gear 91.

Formed on the top of the housing 88 is a boss 97 to which the steady bar 98 is adjustably clamped by the cap 99. The steady bar 98 and spindle shaft 93 extend forwardly of the housing 88 and are joined together by the removable link 100. The milling cutter 69 is mounted on the spindle shaft in the usual fashion.

The brace bracket 78 positioned to the right of the milling unit 77 is adjustably secured to the bed of the lathe by a bolt 101 and is provided with an upright 102 forming a hole for adjustably receiving the brace bar 103. The left end of the brace bar is rigidly received in a boss 104 formed on the right wall of the housing 88. The brace bracket 78 and bar 103 thus cooperate with the arm 87 on the head stock unit to hold the milling unit 77 rigid with respect to the bed of the lathe. The brace bracket 78 can be adjusted inwardly toward the milling unit as closely as the size of the work piece being operated on will permit.

I have thus described two modified forms of my mechanism for utilizing the power and adjustable carriage of a lathe to accomplish a milling operation. I have not illustrated other possible variations of my attachment as it is believed that others may adapt the theory of my invention to such specialized situations as may appear necessary without further disclosure.

Having thus described my invention what I claim as new and desire to secure by Letters Patent is:

1. A milling attachment for a lathe comprising a head stock unit adapted to be secured to the bed of the lathe and having a spindle shaft drivingly engageable with the chuck of the lathe, a cross shaft carried by said head stock unit and having oppositely rotating gears thereon driven from said spindle, clutch means for selectively engaging said oppositely rotating gears with said cross shaft, a milling unit having forwardly projecting arms on the bottom thereof adapted to be clamped to the bottom of the bed of a lathe, spaced brackets on said milling unit forming longitudinally spaced vertically extending slideways, a housing slideable along said ways, screw means on one of said brackets for adjusting said housing on said ways, a milling shaft rotatably mounted in said housing and parallel to said cross shaft, means including a chain and sprockets rotatably connecting said milling shaft and said cross shaft, an arbor removably clamped to said milling shaft, a steady bar adjustably clamped to said housing above said milling shaft, and a tie link adjustably clamped between the forward ends of said arbor and said steady bar.

2. A milling attachment for a lathe comprising a head stock unit adapted to be secured to the bed of the lathe and having a spindle shaft drivingly engageable with the chuck of the lathe, a cross shaft carried by said head stock unit and having oppositely rotating gears thereon driven from said spindle, clutch means for selectively engaging said oppositely rotating gears with said cross shaft, a milling unit having forwardly projecting arms on the bottom thereof adapted to be clamped to the bottom of the bed of a lathe, spaced brackets on said milling unit forming longitudinally spaced vertically extending slideways, a housing slideable along said ways, screw means on one of said brackets for adjusting said housing on said ways, a milling shaft rotatably mounted in said housing and parallel to said cross shaft, means including a chain and sprockets rotatably connecting said milling shaft and said cross shaft, and an arbor removably clamped to said milling shaft.

3. A milling attachment for a lathe comprising a head stock unit adapted to be secured to the bed of a lathe and having a spindle shaft drivingly engageable with the chuck of the lathe, a cross shaft carried by said head stock unit and having a gear thereon driven from said spindle, clutch means for selectively engaging said gear with said cross shaft, a milling unit having forwardly projecting arms on the bottom thereof adapted to be clamped to the bottom of the bed of a lathe, spaced brackets on said milling unit forming longitudinally spaced vertically extending slideways, a housing slideable along said ways, screw means on one of said brackets for adjusting said housing on said ways, a milling shaft rotatably mounted in said housing and parallel to said cross shaft, means including a chain and sprockets rotatably connecting said milling shaft and said cross shaft, an arbor removably clamped to said milling shaft.

4. A milling attachment for a lathe comprising a head stock unit adapted to be secured to the bed of the lathe and having a spindle shaft drivingly engageable with the chuck of the lathe, a cross shaft carried by said head stock unit and having a gear thereon driven from said spindle, a milling unit having forwardly projecting arms on the bottom thereof adapted to be clamped to the bottom of the bed of a lathe, spaced brackets on said milling unit forming longitudinally spaced vertically extending slideways, a housing slideable along said ways, screw means on one of said brackets for adjusting said housing on said ways, a milling shaft rotatably mounted in said housing to extend transversely over the bed of the lathe, and means including a chain and sprockets rotatably connecting said milling shaft and said cross shaft.

5. A milling attachment for a lathe comprising a head stock unit adapted to be secured to the bed of the lathe and having a spindle shaft drivingly engageable with the chuck of the lathe, a cross shaft carried by head stock unit and driven from said spindle, a milling unit having forwardly projecting arms on the bottom thereof adapted to be clamped to the bed of the lathe, spaced brackets on said milling unit forming longitudinally spaced vertically extending slideways, a housing slideable along said ways, screw means on one of said brackets for adjusting said housing on said ways, a milling shaft rotatably mounted in said housing to extend transversely over the bed of the lathe, means including a chain and sprockets rotatably connecting said milling shaft and said cross shaft.

6. A milling attachment for a lathe comprising a head stock unit adapted to be secured to the bed of the lathe and having a spindle shaft drivingly engageable with the chuck of the lathe, a cross shaft carried by said head stock unit and driven from said spindle, a milling unit having forwardly projecting arms on the bottom thereof adapted to be clamped to the bed of the lathe, spaced brackets on said milling unit forming longitudinally spaced vertically extending slideways, a housing slideable along said ways, screw means on one of said brackets for adjusting said housing on said ways, a milling shaft rotatably mounted in said housing to extend transversely over the bed of the lathe, and means drivingly connecting said milling shaft and said cross shaft.

7. A milling attachment for a lathe comprising a head stock unit adapted to be secured to the bed of a lathe and having a spindle receivable in the chuck of the lathe, a cross shaft mounted on said head stock unit, selectively reversible means for connecting said spindle to said cross shaft, a milling unit adapted to be clamped to said lathe below and to the rear of the ways thereof, a housing vertically adjustably mounted on said milling unit, an axially recessed milling shaft rotatably mounted in said housing, means including a chain for driving said milling shaft from said cross shaft, and an arbor removably clamped in the recess of said milling shaft and projecting forwardly over the bed of the lathe when said milling unit is mounted on the lathe.

8. A milling attachment for a lathe comprising a head stock unit adapted to be secured to the bed of a lathe and having a spindle receivable in the chuck of the lathe, a cross shaft mounted on said head stock unit, means for connecting said spindle to said cross shaft, a milling unit adapted to be clamped to said lathe below and to the rear of the ways thereof, a housing vertically adjustably mounted on said milling unit, a milling shaft rotatably mounted in said housing, and means including a chain for driving said milling shaft from said cross shaft.

9. A milling attachment for a lathe comprising, a milling unit support having a downwardly and forwardly projecting bracket adapted to be clamped to the bottom of the bed of a lathe whereby the support is located rearwardly of the ways of the lathe, a housing vertically adjustably mounted on said support, a milling shaft rotatably mounted in said housing to project forwardly over the ways of the lathe, a sprocket on the rear of said milling shaft, and means for drivingly connecting said sprocket to the driving chuck of the lathe, said means including a chain adapted to extend laterally along the rear of the ways of the lathe and drivingly connected to a headstock unit adapted to be clamped to the bed of the lathe adjacent the driving chuck of the lathe whereby the ways of the lathe are unobstructed below said milling shaft and for substantial distances to each side thereof, said headstock unit having a cross shaft engaged with said chain, and a spindle drivingly connected to said cross shaft and adapted to be received in the driving chuck of the lathe.

10. A milling attachment for a lathe comprising, a milling unit support having a downwardly and forwardly projecting bracket adapted to be clamped to the bottom of the bed of a lathe whereby the support is located rearwardly of the ways of the lathe, a housing vertically adjustably mounted on said support, a milling shaft rotatably mounted in said housing to project forwardly over the ways of the lathe, a sprocket on the rear of said milling shaft, and means for drivingly connecting said sprocket to the driving chuck of the lathe, said means including a chain adapted to extend laterally along the rear of the ways of the lathe and drivingly connected to a headstock unit adapted to be clamped to the bed of the lathe adjacent the driving chuck of the lathe whereby the ways of the lathe are unobstructed below said milling shaft and for substantial distances to each side thereof.

11. A milling attachment for a lathe comprising, a headstock unit adapted to be clamped to the lathe adjacent the headstock thereof, a cross shaft journaled in said headstock unit and projecting rearwardly therefrom, a milling unit support having a downwardly and forwardly projecting bracket adapted to be clamped to the bottom of the bed of the lathe, a housing vertically adjustably mounted on said support and in spaced unobstructing relationship with the ways of the lathe when said bracket is mounted on said lathe, a milling shaft journaled in said housing to project forwardly over the ways of the lathe, a chain drivingly connecting said milling shaft and said cross shaft, and means including a spindle drivingly associated with said cross shaft and receivable in the chuck of the lathe for drivingly connecting said cross shaft to the chuck of the lathe.

12. A milling attachment for a lathe comprising, a headstock unit adapted to be clamped to the lathe adjacent the headstock thereof, a cross shaft journaled in said headstock unit and projecting rearwardly therefrom, a milling unit support having a downwardly and forwardly projecting bracket adapted to be clamped to the bottom of the bed of the lathe, a housing vertically adjustably mounted on said support and in spaced unobstructing relationship with the ways of the lathe when said bracket is mounted on said lathe, a milling shaft journaled in said housing to project forwardly over the ways of the lathe, a chain drivingly connecting said milling shaft and said cross shaft, and means for drivingly connecting said cross shaft to the chuck of the lathe.

References Cited in the file of this patent

UNITED STATES PATENTS

| Number | Name | Date |
|---|---|---|
| 1,028,728 | Hughes | June 4, 1912 |
| 1,052,116 | Wood | Feb. 4, 1913 |
| 1,497,113 | Meyer | June 10, 1924 |
| 2,455,662 | Dyer | Dec. 7, 1948 |
| 2,495,927 | Francis | Jan. 31, 1950 |
| 2,500,880 | Solomon | Mar. 14, 1950 |

FOREIGN PATENTS

| Number | Country | Date |
|---|---|---|
| 377,069 | Germany | June 9, 1923 |